United States Patent [19]

Beddome et al.

[11] Patent Number: 5,226,234

[45] Date of Patent: Jul. 13, 1993

[54] METHOD FOR ASSEMBLING HEAT EXCHANGER TUBES

[75] Inventors: David W. Beddome, Amherst; Peter A. Lyon, Lockport, both of N.Y.

[73] Assignee: General Motors Corporation, Detroit, Mich.

[21] Appl. No.: 905,616

[22] Filed: Jun. 29, 1992

[51] Int. Cl.[5] ............................................. B23P 15/26
[52] U.S. Cl. .................................. 29/890.039; 29/726
[58] Field of Search .................. 29/890.039, 429, 430, 29/726, 890.03

[56] References Cited

U.S. PATENT DOCUMENTS

| | | | |
|---|---|---|---|
| 3,762,031 | 10/1973 | Jonason et al. | 29/890.039 |
| 4,893,673 | 1/1990 | Rosman et al. | 29/890.039 |
| 5,138,764 | 8/1992 | Breda et al. | 29/890.039 |

Primary Examiner—Irene Cuda
Attorney, Agent, or Firm—Patrick M. Griffin

[57] ABSTRACT

Plates for forming heat exchanger tubes are assembled into pairs by an assembly machine having two cooperating rotors, each having a plate input, and a feed mechanism transfers plates of different types from stacks of plates to the machine in a desired order. A conveyor belt for each rotor carries plates from a number of magazines above the conveyor to the rotor. Escapements on the magazines drop plates onto the conveyors. A controller actuates the escapements in a sequence to arrange the plate types on the conveyor in the correct order, and also controls indexing of the conveyor and the assembly machine. Rollers associated with each rotor affords a conveyor return which does not interfere with the assembly operation.

2 Claims, 2 Drawing Sheets

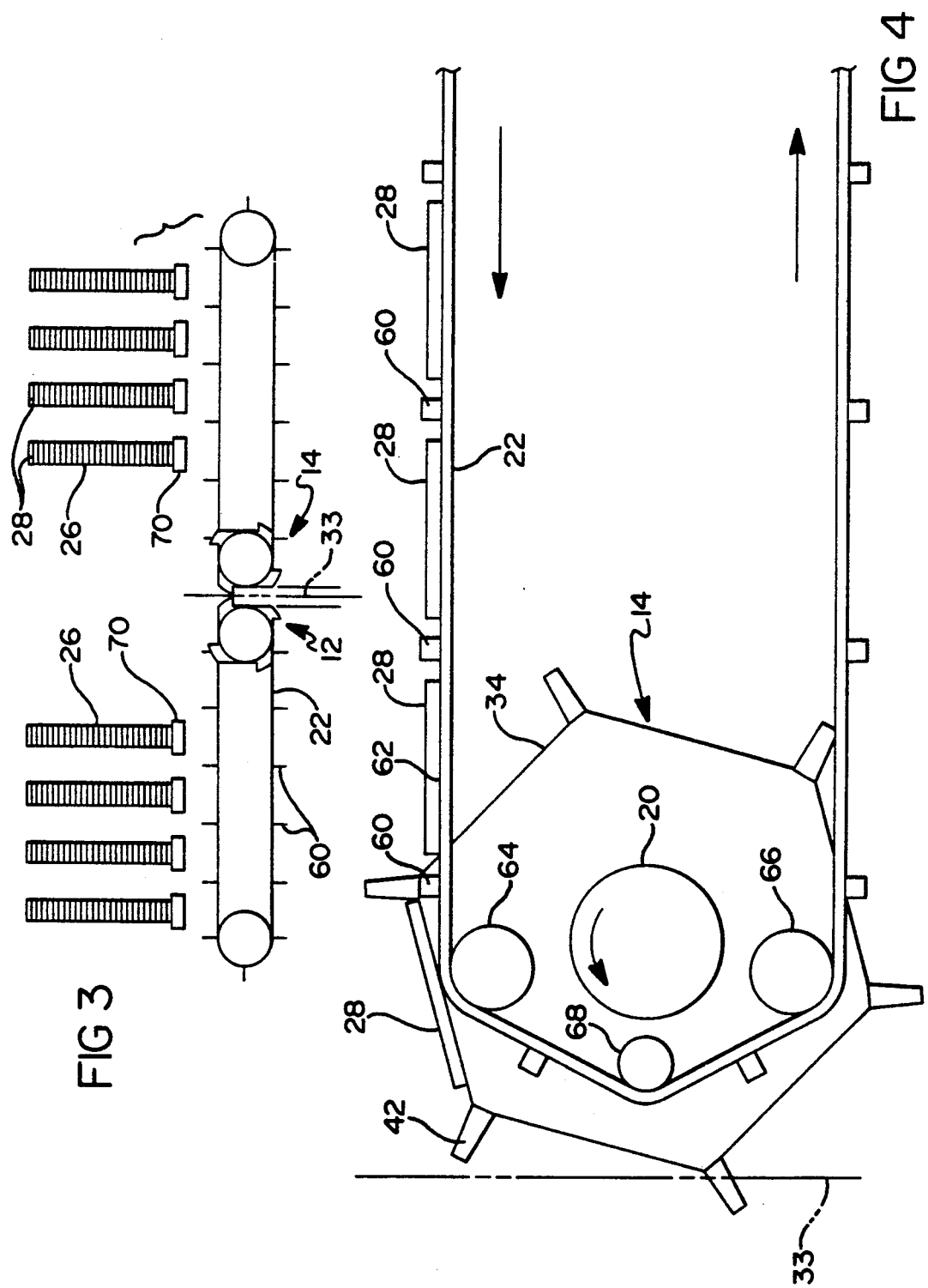

METHOD FOR ASSEMBLING HEAT EXCHANGER TUBES

FIELD OF THE INVENTION

This invention relates to the assembly of pairs of plates to form tubes for heat exchangers and particularly to a method and apparatus for assembling different types of plates to form plate pairs of desired combinations of types.

BACKGROUND OF THE INVENTION

Heat exchangers of the plate type are comprised of pairs of preformed plates joined to other pairs at their ends by integral bosses and separated at their middle section by air centers or corrugated fins, the plates and fins all being brazed together so that each pair of plates becomes a tube for carrying refrigerant, the bosses serving as a manifold for permitting refrigerant flow from one tube to another, and the fins facilitation heat exchange between the tubes and air flowing outside the tubes. U.S. Pat. No. 4,470,455 issued to Sacca describes such a plate type heat exchanger in detail. Special types or species of plates are used for the end plates of an assembly to provide fittings for external connections. Some special intermediate plate types are also used to define flow passages in the heat exchanger.

U.S. Pat. Nos. 4,860,421 and 4,900,328 issued to Breda et al and incorporated herein by reference disclose a machine for assembling plate pairs and subsequent placement into an array of plate pairs prior to brazing. The machine has a pair of rotors with indexing drive means for synchronously rotating the rotors, and pockets for receiving plates. The rotors, when indexed, each move a plate into a common mating plane such that the plates are joined together and the resulting plate pair falls into a fixture below for assembling the plate pairs into a heat exchanger core. The core is subsequently brazed to complete the joining of each plate pair as well as joining each pair to its neighbor at their bosses. Plates are supplied to the rotors by a stack of plates or a vertical magazine containing plates above each rotor and an escapement for releasing the plates from each stack one at a time to deposit the plates directly into the rotor pockets. Alternatively, one or both of the magazines is replaced by a plurality of magazines laterally spaced from the rotors and a shuttle or carriage selectively transfers plates from the magazines to the rotors. This arrangement permits different types of plates to be loaded in the several magazines so that special plate combinations can be constructed. Typically, that apparatus is operated with a magazine of regular plates directly feeding one rotor and a shuttle serving three magazines feeding the other rotor. The shuttle tends to slow down the operation because of the time it takes to move back and forth. If more magazines are served by a shuttle the distance travelled and the time consumed by the shuttle increases; the practical limit is three magazines per shuttle for an acceptable rate of production, which is greater then one plate pair per second. To have the capability of assembling a larger variety of plates it is desirable to have an improved method and apparatus for feeding plates to an assembly machine. Then the machine will have more flexibility in the type of cores it can make and the production rate is not decreased.

SUMMARY OF THE INVENTION

It is therefore an object of the invention to provide an improved method and apparatus for feeding plates to an assembling machine for the manufacture of heat exchanger. It is another object to provide such a method and apparatus having an unlimited number of types of plates which can be assembled with no decrease in the rate of assembly.

The invention is carried out in the manufacture of heat exchangers having tubes constructed of pairs of plates, by the method of combining plates of various types into plate pairs of predetermined types comprising the steps of: providing two paths for feeding plates to an assembly station; assembling stacks of different types of plates above each path, each stack containing plates of a single type; selectively dropping plates from the stacks onto each path to thereby arrange the types of plates in predetermined order in each path; and assembling pairs of plates in the order that they are fed to the assembly station whereby each plate pair comprises a plate from each path and of types of plates determined by the order in each path.

The invention is further carried out by apparatus for assembling heat exchanger tubes by combining pairs of plates of various types comprising: an assembly device for mating separate plates into plate pairs; two conveyors for feeding plates to the assembly device, each conveyor furnishing one plate of each pair; supply means for separately supplying different types of plates; and means for determining the types of plates in each path including means for transferring plates from the supply means to each conveyor and ordering the plates in determined sequences of types, whereby each plate pair comprises types of plates according to the order of plates fed to the assembly device.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a schematic elevation of the apparatus of FIG. 1; and

FIG. 4 is an enlarged view of the feed and assembly apparatus taken along line 4—4 of FIG. 1.

DESCRIPTION OF THE INVENTION

Figure 1:
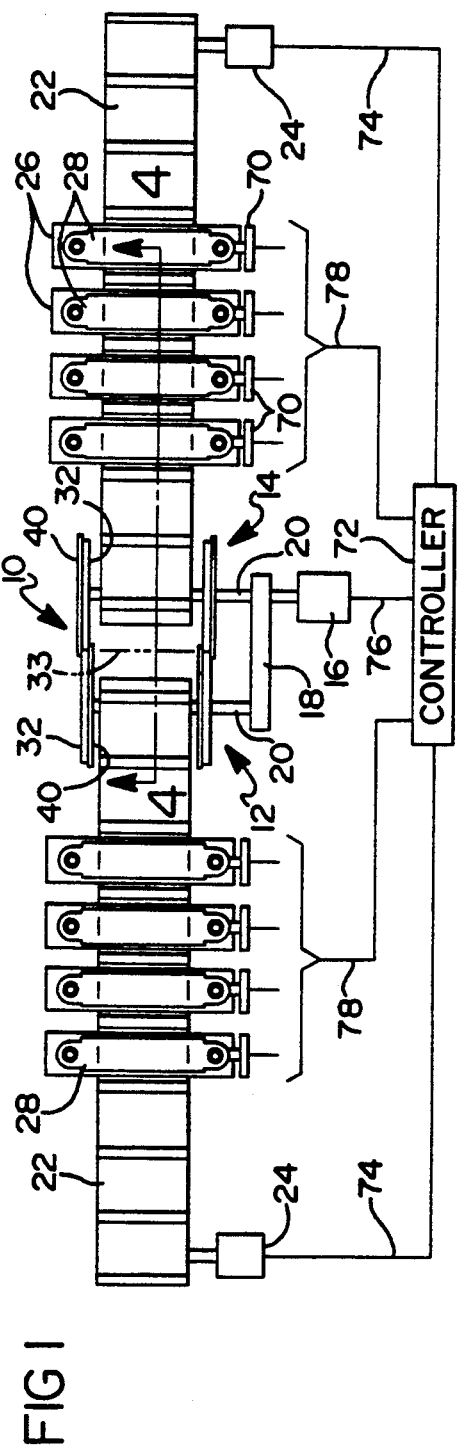
FIG. 1 is a schematic plan view of a plate feed and assembly apparatus.
Figure 2:
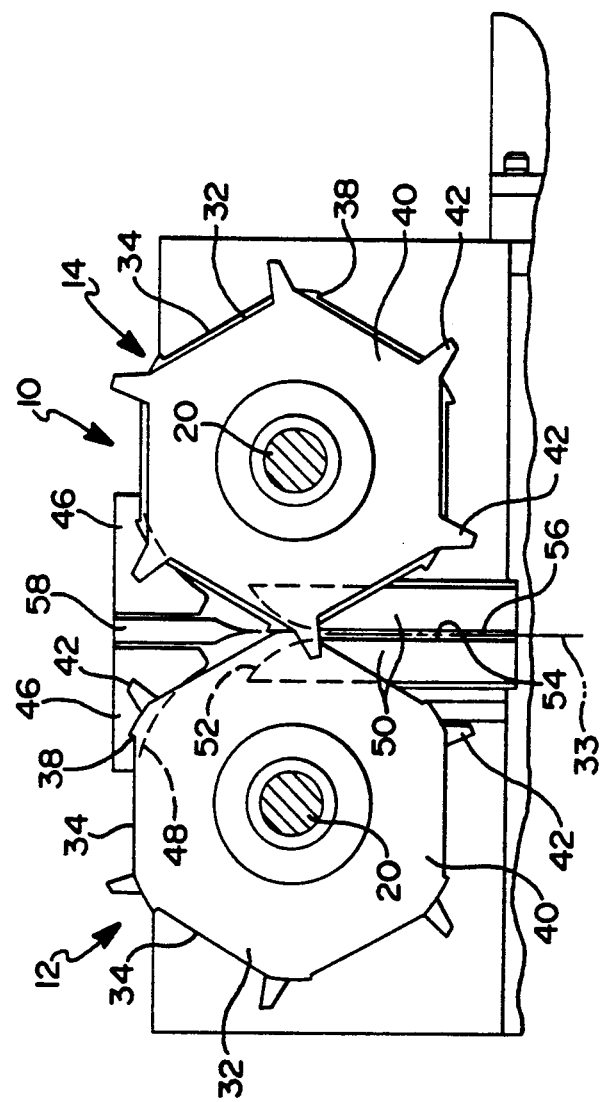
FIG. 2, is an elevation of the assembly apparatus of FIG. 1.

Referring to FIGS. 1 and 2 of the drawings, a plate assembly apparatus 10 comprising rotors 12 and 14 having shafts 20 driven by a servo motor 16 through a gearbox 18 for synchronously indexing the rotors in counter-rotating directions. Two conveyor belts 22, each driven by a servo motor, 24 loop around the shafts 20 and pass beneath magazines 26 containing plates 28 to be assembled in pairs by the apparatus 10. Thus the conveyors define two paths for carrying plates to the assembly station.

The assembly apparatus 10, which is more fully described in the above mentioned Breda et al patents, is shown in FIG. 2 and comprises the rotors 12 and 14 and guides to be described. Each rotor further includes a pair of spaced wheels 32 mounted on the shaft 20 for rotation therewith, the wheels having a diameter substantially equal to the spacing of the shafts 20 so that the wheels on one shaft approximately meet the respective cooperating wheels on the other shaft adjacent a central vertical mating plane 33. Six flats or pockets 34 on the periphery of each wheel 32 are provided to receive and carry the plates 28 which are being assembled by the machine. A shoulder 38 at the leading edge (in the direction of wheel rotation) of each flat helps locate the plate in its proper position. A disk 40 secured to each wheel 32 has fingers 42 projecting radially beyond the wheel periphery, each finger being located at the trailing edge of a pocket 34 to serve as a part locator and as a driver to move the part through its path. The disks 40 are on the outside surface of one wheel 32 and on the inside surface of the cooperating wheel so that the disks 40 are in separate planes and the fingers do not collide upon wheel rotation.

Outboard of the wheels 32 guides, which are plates with contoured edges, are positioned to contact the ends of each plate 28 to control the plate path during each wheel rotation. At each end, an upper guide 46 for each wheel 32 has an arcuate edge 48 generally concentric with the respective shaft 20 and is positioned above the wheel to allow the upper surface of the plate end to slide on the edge 48 during a portion of the wheel rotation. This assures that the plate 28 remains nested in the pocket 34. A lower guide 50 for each wheel has a curved edge 52 facing outwardly from the shaft 20 and is positioned in the part path after the upper guide ends for engaging the lower surface of the plate end to lift the plate 28 from the pocket 34 as the part paths are about to converge. The lower guide also has a straight vertical edge 54 extending down from the curved edge 52. The two adjacent lower guides 50 are slightly spaced to define a narrow channel 56 along the mating plane 33 for slidingly carrying a plate pair assembly from the machine. Finally, a center guide 58 centered on the mating plane 33 comprises a narrow downwardly tapered plate between the curved edges 52 of the lower guide 50.

Referring to FIGS. 3 and 4, the conveyors 22 each have a return adjacent the respective rotors 12, 14 to guide the conveyor belt around the shaft 20 while maintaining a distance from the mating plane 33 to avoid any interference with the movement of plates in and near the mating plane. The return mechanism for each conveyor includes upper and lower rollers 64 and 66 above and below the shaft 20 respectively, and an inner roller 68 between the shaft 20 and the mating plane 33. The conveyors 22 have dividers 60 spaced along the surface in the direction of movement to define compartments 62 to receive plates 28, each plate being positioned flat on the conveyor belt 22.

The magazines 26 are positioned directly above the conveyor paths and each one holds a stack of plates 28 which are metered one by one from the bottoms of the magazines. The magazines are loaded with various types of plates according to the requirements of the heat exchanger design. An electrically controlled escapement 70 at the bottom of each magazine 26 dispenses the plates which drop onto the conveyor 22. By properly timing the actuation of the magazines during conveyor operation, the compartments 62 can be loaded with any desired order of plate types. A control system supervises the escapement actuation as well as the conveyor movement and the machine 10 operation.

A controller 72, shown in FIG. 1, which may be a microprocessor based machine is coupled by lines 74 to the servomotors 24 and by line 76 to the servomotor 16. The controller further has a plurality of lines 78 leading to the escapements 70 of the individual magazines 26. In operation, the controller energizes the motors 16, 24 to synchronously index the rotors 12, 14 and the conveyors 22 at a rate on the order of one or two index events per second. For the rotor design of FIG. 4, which has six pockets per rotor, the rotors are indexed 60° at a time to assemble a plate pair in the mating plane. The conveyors 22 are indexed to advance by one compartment 62 to thereby supply one plate 28 to the top of each rotor during each index period. The controller is programmed to fill the compartments with the types of required plates in the proper sequence. Since the magazines 26 are arrayed along the conveyor path, the escapements must be actuated when the correct compartment is beneath the respective magazine to attain the right sequence of types. Thus for the magazines feeding one of the rotors an escapement is not necessarily actuated for every index event and, on the other hand, more than one may be actuated for each index period. Of course, on average there will be one plate added to each conveyor 22 for each index event.

The number of magazines 26 is dependent on the number of different types of plates to be fed to each rotor, and the conveyor length is determined by the number of magazines to be serviced. No shuttle is needed to transport plates from the magazines to the assembly machine and the production rate of the apparatus is not limited by the addition of more types of plates; thus the improved feed system is highly practical. While the feed arrangement has special advantages where many plate types are required by the heat exchanger design, due to its simplicity it is also desirable for the applications where few plate types are used.

The embodiments of the invention in which an exclusive property or privilege is claimed are defined as follows:

1. In a mechanism having an assembly station for assembling plates selected from a supply of different kinds of plates into plate pairs for the manufacture of heat exchangers, a method for indirectly providing plates to the assembly station, comprising the steps of:
   providing two linear paths that are laterally spaced to either side of the assembly station for conveying plates to the assembly station;
   providing a plurality of stacks of plates, each stack containing one of the different kinds of plate, discretely spaced along the length of said paths and stationary relative to the assembly station;
   arranging types of plates in each path according to a predetermined order by selectively transferring plates of different kinds from the respective stacks of the paths;
   moving the plates in order along the paths to the assembly station; and
   assembly plates from each path into plate pairs whereby each pair comprises predetermined kinds of plates.

2. In the manufacture of heat exchanges having tubes constructed of pairs of plates, a method of combining plates of various types into plate pairs of predetermined types, comprising the steps of:
   providing two linear, moving paths that are laterally spaced to either side of an assembly station for feeding plates to the assembly station;
   providing stacks of different types of plates discretely spaced along the length of, and stationary relative to each path, each stack containing plates of a single type;

selectively dropping plates from the stacks onto each path to thereby arrange the types of plates in predetermined order in each path; and assembling pairs of plates in the order that they are fed to the assembly station whereby each plate pair comprises a plate from each path and of types of plates determined by the order in each path.

* * * * *